US012705801B2

(12) United States Patent
Gokul et al.

(10) Patent No.: US 12,705,801 B2
(45) Date of Patent: Aug. 11, 2026

(54) SYSTEMS AND METHODS FOR PERSONALIZED IMAGE GENERATION

(71) Applicant: Salesforce, Inc., San Francisco, CA (US)

(72) Inventors: Akash Gokul, San Francisco, CA (US); Nikhil Naik, Mountain View, CA (US); Senthil Purushwalkam Shiva Prakash, Mountain View, CA (US)

(73) Assignee: Salesforce, Inc., San Francisco, CA (US)

( * ) Notice: Subject to any disclaimer, the term of this patent is extended or adjusted under 35 U.S.C. 154(b) by 248 days.

(21) Appl. No.: 18/425,217

(22) Filed: Jan. 29, 2024

(65) Prior Publication Data

US 2025/0173913 A1 May 29, 2025

Related U.S. Application Data

(60) Provisional application No. 63/602,965, filed on Nov. 27, 2023.

(51) Int. Cl.

| | |
|---|---|
| ***G06T 11/00*** | (2026.01) |
| ***G06V 10/77*** | (2022.01) |
| ***G06V 10/80*** | (2022.01) |
| ***G06V 10/82*** | (2022.01) |

(52) U.S. Cl.

CPC .......... *G06T 11/00* (2013.01); *G06V 10/7715* (2022.01); *G06V 10/806* (2022.01); *G06V 10/82* (2022.01)

(58) Field of Classification Search

CPC .. G06T 11/00; G06V 10/7715; G06V 10/806; G06V 10/82

See application file for complete search history.

(56) References Cited

U.S. PATENT DOCUMENTS

2022/0138914 A1* 5/2022 Wang ........................ G06T 5/77

OTHER PUBLICATIONS

Ye, Hu, et al. "Ip-adapter: Text compatible image prompt adapter for text-to-image diffusion models." arXiv preprint arXiv: 2308.06721 (2023) (Year: 2023).*

Cao, Mingdeng, et al. "MasaCtrl: Tuning-Free Mutual Self-Attention Control for Consistent Image Synthesis and Editing." arXiv preprint arXiv:2304.08465 (2023) (Year: 2023).*

(Continued)

*Primary Examiner* — Daniel F Hajnik
*Assistant Examiner* — Chris Alejandro Puntier
(74) *Attorney, Agent, or Firm* — Haynes and Boone, LLP

(57) ABSTRACT

Embodiments described herein provide a framework designed to enable personalized image generation capabilities in a pretrained text-to-image generation model. The architecture comprises two replicas of the pretrained text-to-image model—a reference UNet dedicated to extracting visual features from reference images and a base UNet for the actual image generation process. The reference UNet processes reference images to collect the features before each Self-Attention (SA) layer of the reference UNet. The base UNet's SA layers are modified to "Reference Self-Attention" (RSA) layers that allow conditioning on extra features. Using the collected reference features as input, the base UNet equipped with the RSA layers estimates the noise in the input to guide the image generation towards the reference objects.

17 Claims, 13 Drawing Sheets

(56) References Cited

OTHER PUBLICATIONS

Richardson, Elad, et al. "Encoding in Style: a StyleGAN Encoder for Image-to-Image Translation." arXiv preprint arXiv:2008.00951 (2020) (Year: 2021).*

Lvmin Zhang, Anyi Rao, and Maneesh Agrawala. Adding conditional control to text-to-image diffusion models. In Proceedings of the IEEE/CVF International Conference on Computer Vision, pp. 3836-3847, 2023.

* cited by examiner

| Method | Zero-shot | CLIP-T | CLIP-I | DINO |
|---|---|---|---|---|
| BLIP Diffusion | ✓ | 30.0 | 77.9 | 59.4 |
| ELITE | ✓ | 25.5 | 76.2 | 65.2 |
| ELITE (reproduced) | ✓ | 29.6 | 78.8 | 61.4 |
| Ours | ✓ | **31.1** | **79.7** | **67.4** |
| Textual Inversion | ✗ | 25.5 | 78.0 | 56.9 |
| DreamBooth | ✗ | 30.5 | 80.3 | 66.8 |
| CustomDiffusion | ✗ | 24.5 | 80.1 | 69.5 |
| BLIP Diffusion + FT | ✗ | 30.2 | 80.5 | 67.0 |
| Reference Images | - | - | 88.5 | 77.4 |

FIG. 9

| | Trainable Parameters | | Use Aug. | CLIP-T | CLIP-I | DINO |
|---|---|---|---|---|---|---|
| | Base UNet | Ref. UNet | | | | |
| | All | All | ✓ | | OOM | |
| | None | All | ✓ | 30.6 | 72.8 | 43.8 |
| | All | None | ✓ | 31.6 | 78.8 | 66.4 |
| | RSA | None | ✓ | 30.9 | 78.2 | 64.9 |
| | RSA | All | ✗ | 30.2 | 78.8 | 67.0 |
| (Ours) | RSA | All | ✓ | 31.1 | 79.7 | 67.4 |

FIG. 10

SYSTEMS AND METHODS FOR PERSONALIZED IMAGE GENERATION

CROSS REFERENCE(S)

The instant application is a nonprovisional of and claim priority under 35 U.S.C. 119 to U.S. provisional application No. 63/602,965, filed Nov. 27, 2023, which is hereby expressly incorporated by reference herein in its entirety.

TECHNICAL FIELD

The embodiments relate generally to machine learning systems for image generation, and more specifically to systems and methods for personalized image generation.

BACKGROUND

Machine learning systems have been widely used in image generation tasks. For example, text-to-image generation models generate an output image based on an input text prompt, e.g., "a vase in a snow forest," and/or the like. Existing models may generate images of a particular subject based on a mere text description, (e.g., "a vase") in different contexts or different variations, e.g., different colors, shapes, and/or the like. Such image generation practice thus often requires significant human editing efforts, which can be inefficient and costly. Therefore, there is a need for systems and methods for improved image generation systems.

BRIEF DESCRIPTION OF THE DRAWINGS

FIGS. 8-11 provide charts illustrating exemplary performance of different embodiments described herein.

Figure 1A:
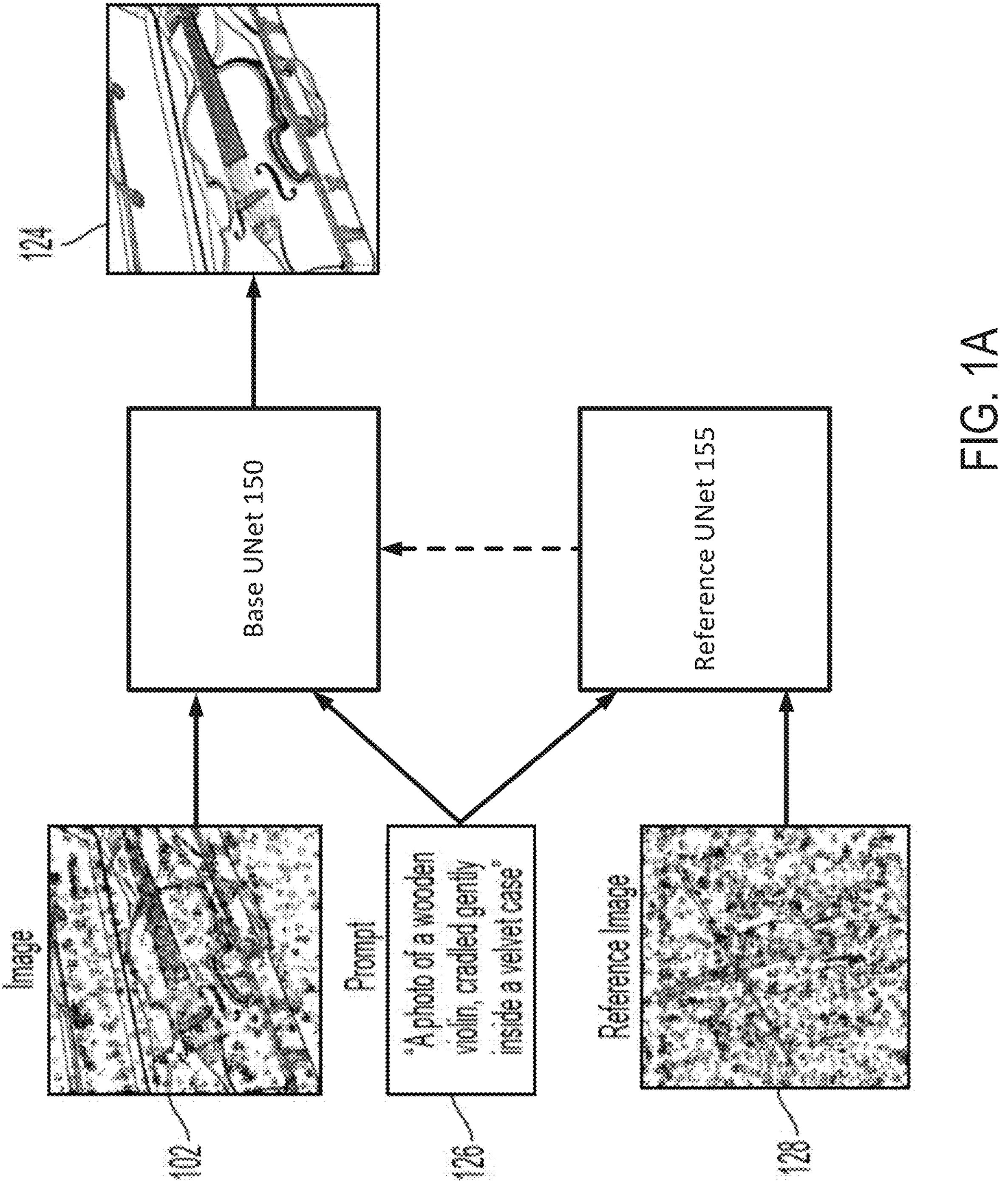
FIG. 1A is a simplified diagram illustrating a personalized image generation framework according to some embodiments.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

As used herein, the term "Large Language Model" (LLM) may refer to a neural network based deep learning system designed to understand and generate human languages. An LLM may adopt a Transformer architecture that often entails a significant amount of parameters (neural network weights) and computational complexity. For example, LLM such as Generative Pre-trained Transformer (GPT) 3 has 175 billion parameters, Text-to-Text Transfer Transformers (T5) has around 11 billion parameters. As used herein, the term "language model" (LM) may refer generally to a language model, which may be an LLM, or another language model. In some embodiments, LMs described herein may be LLMs. In some embodiments, LMs described herein may not be considered LLMs. In some embodiments, functions performed as described herein by a LLM may be performed by a LM. In some implementations, an LLM may be multi-modal, e.g., to receive and handle different types of inputs such as images, videos, code languages, and/or the like.

Machine learning systems have been widely used in image generation tasks. For example, text-to-image generation models generate an output image based on an input text prompt, e.g., "a vase in a snow forest," and/or the like. Existing models may generate images of a particular subject, (e.g., "a vase") in different contexts or different variations. Existing generation models, however, require reiterating a large number (e.g., hundreds or thousands) of tedious fine-tuning steps for each new subject, which hinders these approaches from efficiently extending to a wide range of subjects.

In view of the need for systems and methods for improved image generation, embodiments described herein provide a subject-driven image generation framework that generates images portraying renditions of a given subject using one or a few reference images depicting the subject.

The subject-driven image generation framework may comprise one or more denoising diffusion models (DDMs). DDMs are used for generating realistic images given a conditioning input (e.g., prompt and/or image). The generation process may start with a random noise vector that is iteratively denoised by passing the vector through a denoising model a number of times (e.g., 50 iterations) conditioned by the text prompt, which progressively produces a denoised image vector that results in the output image. Subject-driven image generation may use a denoising diffusion model to generate an image with a rendition of a subject (e.g., the same subject in a different position or on a different background), which may be provided in a reference image of the subject.

Specifically, a pretrained denoising model (such as an iterative denoising diffusion model built on a UNet architecture) may be used as a base model, and a copy of the pretrained UNet may be used as a reference model. The reference model is provided the reference image as an input.

At each self-attention layer of the base model UNet, the latent features are concatenated with the latent features of the reference model UNet and input to the self-attention layer of the base model UNet.

In order to train the personalized image generation model, a training dataset may be synthetically generated using pretrained text-to-image generation models, state-of-the-art chat agents and image segmentation models. Details of generating the training dataset are further described with reference to FIG. 2.

In this way, at inference, the reference model, as conditioned by the reference image, controls the image generation performed by the base UNet model via an attention mechanism. Image generation may thus be controlled and/or "personalized" by feeding reference images that depict "personalized" visual preferences, e.g., from a user. Neural network technology in computer vision is thus improved.

FIG. 1A is a simplified diagram illustrating a personalized image generation framework according to some embodiments. The model may include a reference UNet 155 and base UNet 150. UNets 150 and 155 may be neural network based models trained to denoise an input image according to an input prompt (e.g., denoising model 512 described in FIG. 5). Reference UNet 155 and base UNet 150 may be the same model architecture, and may be initialized (i.e., pre-trained) with the same parameters. Base UNet 150 may take random noise or a noised image (e.g., image 102) as an input, and denoise the input image as conditioned by a prompt 126 to generate an output image 124. In some embodiments, Base UNet 150 is used to iteratively denoise a noisy image incrementally (e.g., over 50 steps). The initial input to Base UNet 150 may be random noise. For subsequent steps, the input to base UNet 150 may be the incrementally denoised image output by base UNet in the previous iteration. A time step may also be input to base UNet 150, thereby providing base UNet 150 with an estimate of the amount of noise remaining in image 102. The denoising process may be performed over a predetermined fixed number of steps (e.g., 50 steps).

In some embodiments, rather than initializing image 102 with random noise, image 102 is initialized with a noised version of an image (e.g., noised via a reverse process using base UNet 150 or otherwise noised). Initializing image 102 with a noised input image may result in an output image 124 that is a modification of the input image. Using a noised image as the initialization for image 102, however, allows for limited control, as the general structure and style of an image may be restrained.

Control over the output of base UNet 150 may be achieved alternatively (or in addition) through the use of reference UNet 155. Reference UNet 155 may receive a reference image 128 as input, and prompt 126. Reference image 128 may be a noised version of an image provided to illustrate a subject (in the illustrated example a violin). UNets 150 and 155 may have a series of internal layers, where a latent image representation (e.g., vector) is output by each layer, and that output is the input to the subsequent layer, as described further in FIG. 1B. Latent representations of reference UNet 155 may be used to modify the behavior of base UNet 150. By providing a reference image 128 to reference UNet 155, the latent representations of reference UNet 155 contain information relevant to the subject of the reference image 128.

The latent representation of reference UNet 155 may be used to modify the latent representation of base UNet 150, thereby providing a method of controlling the generation of image 124 by base UNet 150. The latent representations used in the modification of base UNet 150 may be a subset of the latent representations of reference UNet 155 (e.g., the inputs to self-attention layers as described in FIG. 1B). Modification of latent representations of base UNet 150 may be achieved, for example, by concatenating the latent representations of base UNet 150 with the latent representations of reference UNet 155, and using those concatenated representations as inputs to the subsequent layers of base UNet 150.

In some embodiments, multiple reference images 128 may be used in the generation of a single output image 124. For example, each of the reference images may contain the same subject, but in different settings, poses, etc. The latent representations generated by reference UNet 155 for each of the reference images 128 may be combined (e.g., via a weighted average) before being used to modify the latent representations of base UNet 150.

Reference UNet 155 may be trained by providing triplets of prompts 126, reference images 128, and known-good output images 124. A loss function may be computed based on the generated output and the known good output. The loss function may be used to update parameters of reference UNet 155 via backpropagation. In some embodiments, reference UNet 155 is trained, while base UNet 150 remains frozen. This may allow for reference UNet 155 to adapt to capture the relevant information from reference image 128 while allowing base UNet 150 to maintain its image generation and prompt following capabilities. In some embodiments, a subset of the parameters of base UNet 150 may be trainable, for example the self-attention layers as described in FIG. 1B.

Figure 1B:
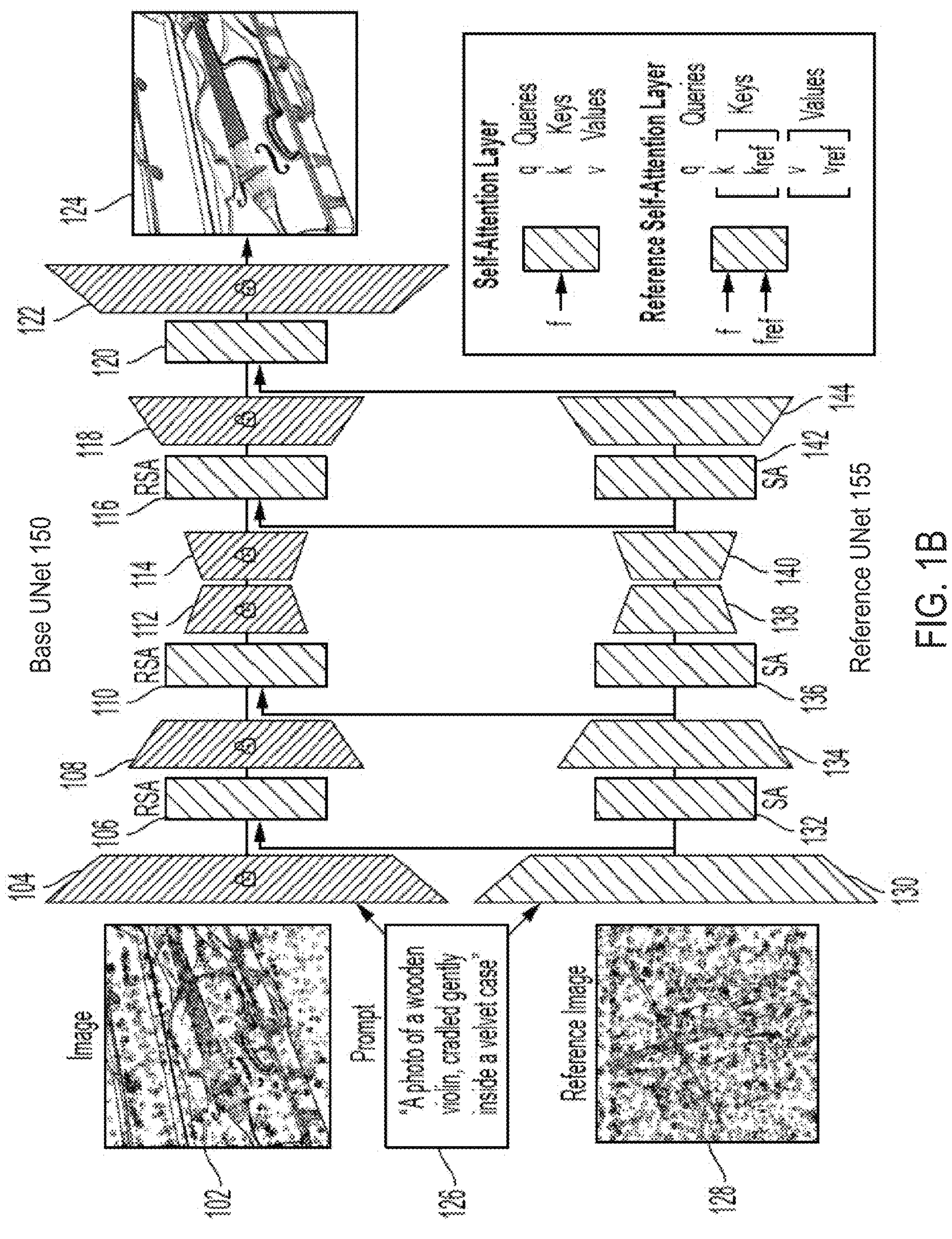
FIG. 1B is a simplified diagram illustrating a personalized image generation framework according to some embodiments.

FIG. 1B is a simplified diagram illustrating a personalized image generation framework according to some embodiments. The framework in FIG. 1B illustrates a more detailed illustration of the framework in FIG. 1A, with exemplary internal components of UNets 150 and 155. Base UNet 150 and Reference UNet 155 may have the same structure, and may be initialized with the same parameters. Base UNet may include a number of encoder layers which decrease the dimensionality of the latent representations (e.g., via pooling and/or convolution) including encoders 104, 108, and 112. Base UNet may also include a number of decoder layers, which increase the dimensionality of the latent representations (e.g., via an up-sampling convolution operation) including decoders 114, 118, and 122.

Self-attention layers may also be included in base UNet 150 which perform self-attention on the latent representations between encoder and/or decoder layers. In self-attention, each input element may be associated with three vectors: key, query, and value. These vectors are linear projections of the input vectors. The key, query, and value vectors may be used to compute attention scores, which determine how much focus should be given to each element when making predictions. The "key" vector may represent the information content of the input element. The "query" vector may represent the element seeking information from other elements. The "value" vector may represent the actual information content of the element. Attention scores may be computed by measuring the similarity between the query vector of one element and the key vectors of all other elements. These scores are then used to weight the corresponding value vectors, and the weighted values are aggregated to obtain the final output representation.

In base UNet 150, the self-attention (SA) layers may be modified to make them "reference" self-attention (RSA) layers 106, 110, 116, and 120, where the key and value inputs are modified to be concatenated with the keys and values of another model. In some embodiments, only a subset of the SA layers of base UNet 150 are modified to be RSA layers. In some embodiments, the selection of SA layers and RSA layers in base UNet 150 is configurable, and may be selected either explicitly or implicitly via a user configuration to achieve different results. For example, by modifying only the early and late SA layers, the style of the output image may be more affected by the reference image and modifying only the center self-attention layers may affect more of the semantics (e.g., specific objects) of the output image. Additional layers may be included in base UNet 150 which are not shown in FIG. 1B, as base UNet 150 illustrates an exemplary architecture. For example, additional encoders, decoders, self-attention/reference self-attention, convolutional layers etc. may be included, or fewer layers may be included. Further, additional connections may be included which are not illustrated for simplicity. For example, skip-connections may connect outputs of earlier layers with inputs of later layers without being processed by intermediary layers, allowing for positional information to be maintained more accurately. The layers illustrated may be encapsulated in more complex operational blocks. For example, the self-attention or reference self-attention layers may be self-attention layers in a transformer block.

Reference UNet 155 may have the same architecture as base UNet 150. For example, reference UNet 155 may have encoders 130, 134, and 138 corresponding to encoders 104, 108, and 112. Reference UNet 155 may have decoder layers 140 and 144 corresponding to decoders 118 and 122. Reference UNet 155 may have self-attention layers 132, 136, and 142 corresponding to self-attention (or "reference self-attention") layers 106, 110, and 116. Since the final output of what would be a full UNet is not utilized in reference UNet 155, but rather the internal latent representation, come final output layers may be removed, or left unused. As illustrated, reference UNet 155 does not include a self-attention layer corresponding to self-attention layer 120, nor does it have a decoder layer corresponding to decoder layer 122.

Reference UNet 155 processes reference images 128 (e.g., sample images of a subject to be used in the personalized generated image) to collect the features before each Self-Attention (SA) layer of reference UNet 155 (e.g., SA layers 132, 136, and 142). The base UNet's SA layers are modified to "Reference Self-Attention" (RSA) layers (e.g., RSA layers 106, 110, 116, and 120) that allow conditioning on extra features. Using the collected reference features as input, the base UNet equipped with the RSA layers estimates the noise in the input to guide the image generation towards the reference objects. UNets and how they are used as a core component of a diffusion image generation model is described in more detail with respect to FIG. 5. For example, base UNet 150 and reference UNet 155 may be denoising models 512 as described in FIG. 5.

In some embodiments, each of RSA layers 106, 110, 116, and 120 of base UNet 150 are provided inputs from reference UNet 155. As illustrated, the inputs RSA layers 106, 110, 116, and/or 120 may be a concatenation of the outputs of the previous layer of base UNet 150 (outputs of encoder 104, encoder 108, decoder 114, and decoder 118 respectively) with the outputs of the corresponding previous layers of the reference UNet 155 (outputs of encoder 130, encoder 134, decoder 140, and decoder 144 respectively). As discussed above, the input to a SA (or RSA) layer may include keys, queries, and values. The concatenation of inputs from base UNet 150 and reference UNet 155 may include concatenating together the keys, and concatenating together the values, while leaving queries unchanged. Since the output of a self-attention layer is controlled by the queries, this allows for the input keys and values of the RSA layers to be modified (e.g., by concatenation with outputs of reference UNet 155) while allowing subsequent layers of base UNet 150 to remain unchanged. Controlling base UNet 150 by modifying the self-attention layers has the advantage of sharing information between the UNets that is not tied to a specific location in the image. In the illustrated example, the violin in the reference image 128 is oriented differently than in the output image 124, but information about the structure and appearance of the violin is able to affect the appearance of the violin in the output image 124 without restrictively controlling the exact orientation, etc.

In some embodiments, only some of the self-attention layers may receive inputs from reference UNet 155. For example, only self-attention layers 106 and 120, or only self-attention layers 110 and 116. In some embodiments, the selection of which self-attention layers are provided inputs from reference UNet 155 is configurable and may be adjusted to achieve a desired behavior. For example, by modifying only the early and late self-attention layers (e.g., 106 and 120), the style of the output image may be more affected by the reference image and modifying only the center self-attention layers (e.g., 110 and 116) may affect more of the semantics (e.g., specific objects) of the output image.

In some embodiments, reference UNet 155 and base UNet 150 are used iteratively as described in FIG. 1A. In some embodiments, control of base UNet 150 by reference UNet 155 may be performed on all iterations. In some embodiments, control may be performed on only a subset of the iterations (e.g., every other iteration). Adjusting the amount of control, or the timing of the control may allow for a user to adjust the behavior of the framework. For example, having reference UNet 155 control (e.g., via concatenation of self-attention layer inputs) for early denoising steps, but not control for later denoising steps, may allow for the reference image 128 to control the general structure of output image 124 but not the details. In another example, having reference UNet 155 control for later denoising steps, but not control for early denoising steps, may allow for the reference image 128 to control the fine details output image 124 but not the general structure.

Image generation using the framework in FIG. 1B may be accomplished using only a pre-trained UNet, with the same parameters for both the base UNet 150 and reference UNet 155. Improvements may be achieved in some instances by fine-tuning one or both of the Unets. As described in FIG. 1A, reference UNet 155 may be trained by providing triplets of prompts 126, reference images 128, and known-good output images 124. A loss function may be computed based on the generated output and the known good output. The loss function may be used to update parameters of reference UNet 155 via backpropagation. In some embodiments, parameters associated with all the layers of reference UNet 155 may be trained. In some embodiments, reference UNet 155 is trained, while base UNet 150 remains frozen. This may allow for reference UNet 155 to adapt to capture the relevant information from reference image 128 while allowing base UNet 150 to maintain its image generation and prompt following capabilities. In some embodiments, a subset of the parameters of base UNet 150 may be trainable, for example the RSA layers.

In some embodiments, the control of base UNet 150 by reference UNet 155 may be described as follows. A pre-trained diffusion UNet model may be dented by $U_\theta(x, c, t)$ where $x_t$ are noisy input latents (e.g., noisy image 102), c is an input text prompt (e.g., prompt 126), and t is the timestep in the denoising (diffusion) process. A self-attention (SA) layer that receives a latent feature $f \in \mathbb{R}^{n x d}$, performs the following operation:

$$SA(f) = W_o\left(\text{softmax}\left(q(f)k(f)^T\right)v(f)\right)$$

Where q, k, and v are linear mappings known as the query, key, and value functions with parameters $W_q$, $W_k$, $W_v \in \mathbb{R}^{d x d'}$ respectively that project the features to a chosen dimension d'. As described above, a self-attention (SA) layer modified to be a reference self-attention (RSA) layer. The RSA operator may take as input the latent features $f \in \mathbb{R}^{n x d}$ and reference features of the same dimension $f_{ref} \in \mathbb{R}^{n_{\text{ref}} x d}$, and performs the following operation:

$$RSA(f, f_{ref}) = W_o\left(\text{softmax}\left(q(f)\begin{bmatrix} k(f) \\ f(f_{ref}) \end{bmatrix}^T\begin{bmatrix} v(f) \\ v(f_{ref}) \end{bmatrix}\right)\right)$$

Where [:] indicates concatenation along the first dimension. The RSA operator facilitates the injection of reference features, allowing the diffusion model (UNet) to "attend" to them in the computation of the output latent feature. Base UNet 150 may be denoted by $$U_\theta^{RSA}\left(x, c, t, \left\{f_{ref}^{(1)}, f_{ref}^{(2)}, \ldots, f_{ref}^{(L)}\right\}\right)$$

containing L RSA layers. For simplicity, the notation $F_{ref}$ may denote the set of L reference features. Note that the RSA operator does not introduce any new parameters and reuses the weight parameters $W_o$, $W_q$, $W_k$, and $W_v$.

Reference UNet 155 may be denoted as $U_\phi(x, c, t)$, initialized with the same parameters ($\theta=\phi$). For a given t, the forward diffusion process may be performed on a reference image $I_{ref}$ to compute the noised reference latents $x'_{ref\_t}$. Features of reference UNet 155 may be extracted before the SA layers as $F_{ref}$. This ensures that the extracted reference features have the appropriate dimensions and are compatible with the weights of the RSA layers.

Finetuning parameters of the reference UNet 155 ($\phi$) may be performed to extract better reference features. Parameters of the RSA layers of base UNet 150 ($W_o$, $W_q$, $W_k$, and $W_v$) may also be finetuned in some embodiments to better utilize the reference features. Given a dataset of triplets containing a reference image 128, a textual prompt 126, and a target image following the textual prompt 126 while accurately depicting the reference object, the framework may be finetuned using the same objective as the underlying latent diffusion UNet model. For example, the objective may be:

$$E_{x,c,\epsilon,t\sim U([0,T])}\|\epsilon - \epsilon_\theta(x_t, t, c)\|_2^2$$

where $\epsilon_\theta$ is the UNet model, the actual noise is $\epsilon$, and the predicted noise is $\epsilon_\theta$. $x_t$ represents the input image/latent, t is the current timestep, and c represents a conditioning vector (e.g., an embedding of text prompt 126).

During training, reference UNet 155 takes as input noisy latents (noised according to timestep t) corresponding to the reference image, along with the timestep t and the prompt 126. Base UNet 150 receives as input noisy latents corresponding to the target image (similarly noised), the timestep t, the target prompt 126, and the reference features collected from the reference UNet 155. The parameters of the reference UNet 155 and the RSA layers of base UNet 150 are updated to accurately estimate the noise in the input latents according to the loss objective. In order to preserve the base UNet 150 prompt following capabilities, reference image features may be randomly dropped with some probability (e.g., 15%), thereby reverting the base UNet 150 model back to the SA based architecture. Training data triplets of prompts, reference images, and target/known-good images may be obtained through a number of methods, including automatic generation as described in FIG. 2.

Figure 2:
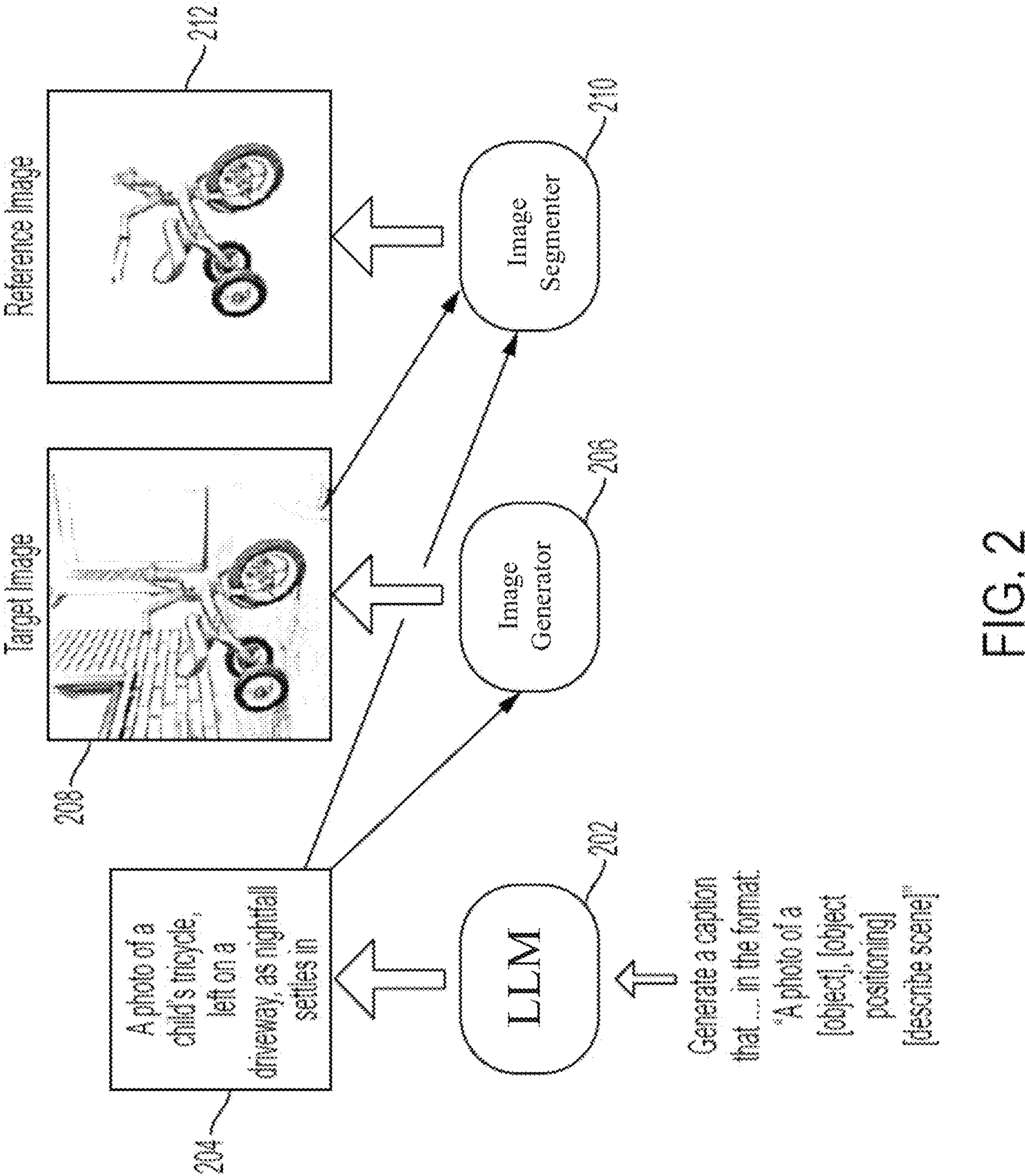
FIG. 2 is a simplified diagram of a data generation framework according to some embodiments.

FIG. 2 is a simplified diagram of a data generation framework according to some embodiments. First, a large language model (LLM) 202 is utilized to generate captions 204 for potential target images 208. For each caption, an image 208 is generating using a pre-trained image generation model 206 (e.g., a latent diffusion model). Using a pretrained image segmentation model 210, the foreground subject of the generated image is extracted and put on a featureless (e.g., plain white) background as the reference image 212.

For training, reference image 212 is used as the reference image 128, and target image 208 is used as the target output of the model in FIGS. 1A-1B. The LLM generated caption is treated as the image generation prompt 126. Using this triplet, the model described herein (e.g., FIGS. 1A-1B) may be trained for personalized image generation. In some embodiments, multiple prompts 204 and associated target images 208 and reference images 212 may be generated using the same prompt for LLM 202. For example, LLM 202 may have a "temperature" setting that may be used to control a level of randomness in generated outputs. By setting the temperature to a certain level (e.g., 0.7), LLM 202 may generate different variations of prompts 204 using the same input prompt. The input prompt to LM 202 may be, for example, "Generate a caption that describes a picture in the format: 'A photo of a [object], [object positioning] [describe scene]'".

Computer and Network Environment

Figure 3A:
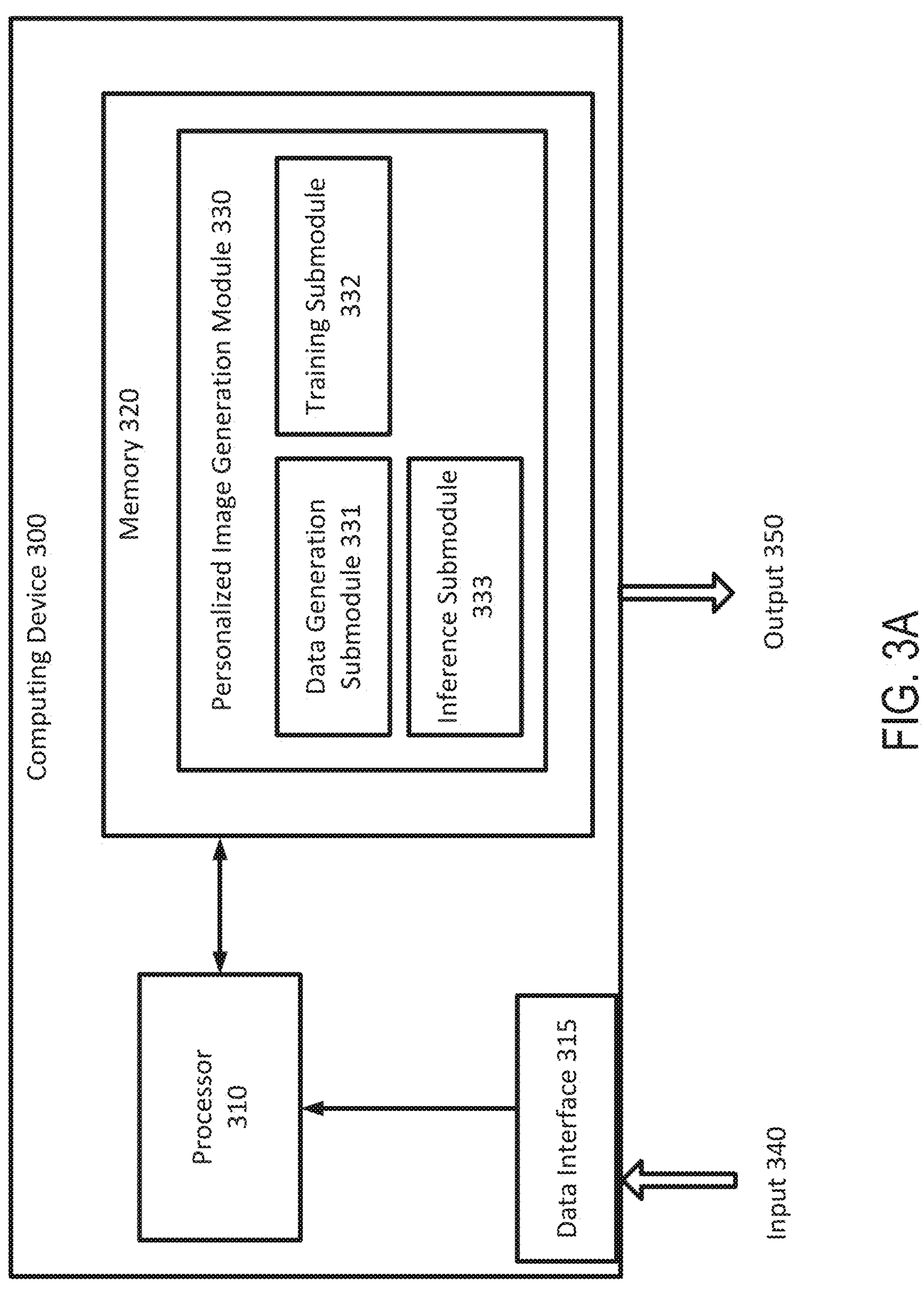
FIG. 3A is a simplified diagram illustrating a computing device implementing the personalized image generation framework described in FIGS. 1A-2, according to some embodiments.

FIG. 3A is a simplified diagram illustrating a computing device 300 implementing the personalized image generation framework described in FIGS. 1A-2, according to some embodiments. As shown in FIG. 3A, computing device 300 includes a processor 310 coupled to memory 320. Operation of computing device 300 is controlled by processor 310. And although computing device 300 is shown with only one processor 310, it is understood that processor 310 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 300. Computing device 300 may be implemented as a stand-alone subsystem, as a board added to a computing device, and/or as a virtual machine.

Memory 320 may be used to store software executed by computing device 300 and/or one or more data structures used during operation of computing device 300. Memory 320 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 310 and/or memory 320 may be arranged in any suitable physical arrangement. In some embodiments, processor 310 and/or memory 320 may be implemented on a same board, in a same package (e.g., system-in-package), on a same chip (e.g., system-on-chip), and/or the like. In some embodiments, processor 310 and/or memory 320 may include distributed, virtualized, and/or containerized computing resources. Consistent with such embodiments, processor 310 and/or memory 320 may be located in one or more data centers and/or cloud computing facilities.

In some examples, memory 320 may include non-transitory, tangible, machine readable media that includes executable code that when run by one or more processors (e.g., processor 310) may cause the one or more processors to perform the methods described in further detail herein. For example, as shown, memory 320 includes instructions for personalized image generation module 330 that may be used to implement and/or emulate the systems and models, and/or to implement any of the methods described further herein. personalized image generation module 330 may receive input 340 such as an input training data (e.g., reference images, known-good personalized images, prompts, etc.) via the data interface 315 and generate an output 350 which may be one or more generated images.

The data interface 315 may comprise a communication interface, a user interface (such as a voice input interface, a graphical user interface, and/or the like). For example, the computing device 300 may receive the input 340 (such as a training dataset) from a networked database via a communication interface. Or the computing device 300 may receive the input 340, such as prompts and reference images, from a user via the user interface.

In some embodiments, the personalized image generation module 330 is configured to generate personalized images as described herein. The personalized image generation module 330 may further include data generation submodule 331 that may be configured to generate training data as described in FIG. 2. The personalized image generation module 330 may further include training submodule 332 that may be configured to train the personalized image generation model as described in FIGS. 1A-1B. The personalized image generation module 330 may further include inference submodule 333 that may be configured to generate personalized images based on one or more reference images and a text prompt as described in FIGS. 1A-1B.

Some examples of computing devices, such as computing device 300 may include non-transitory, tangible, machine readable media that include executable code that when run by one or more processors (e.g., processor 310) may cause the one or more processors to perform the processes of method. Some common forms of machine-readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 3B:
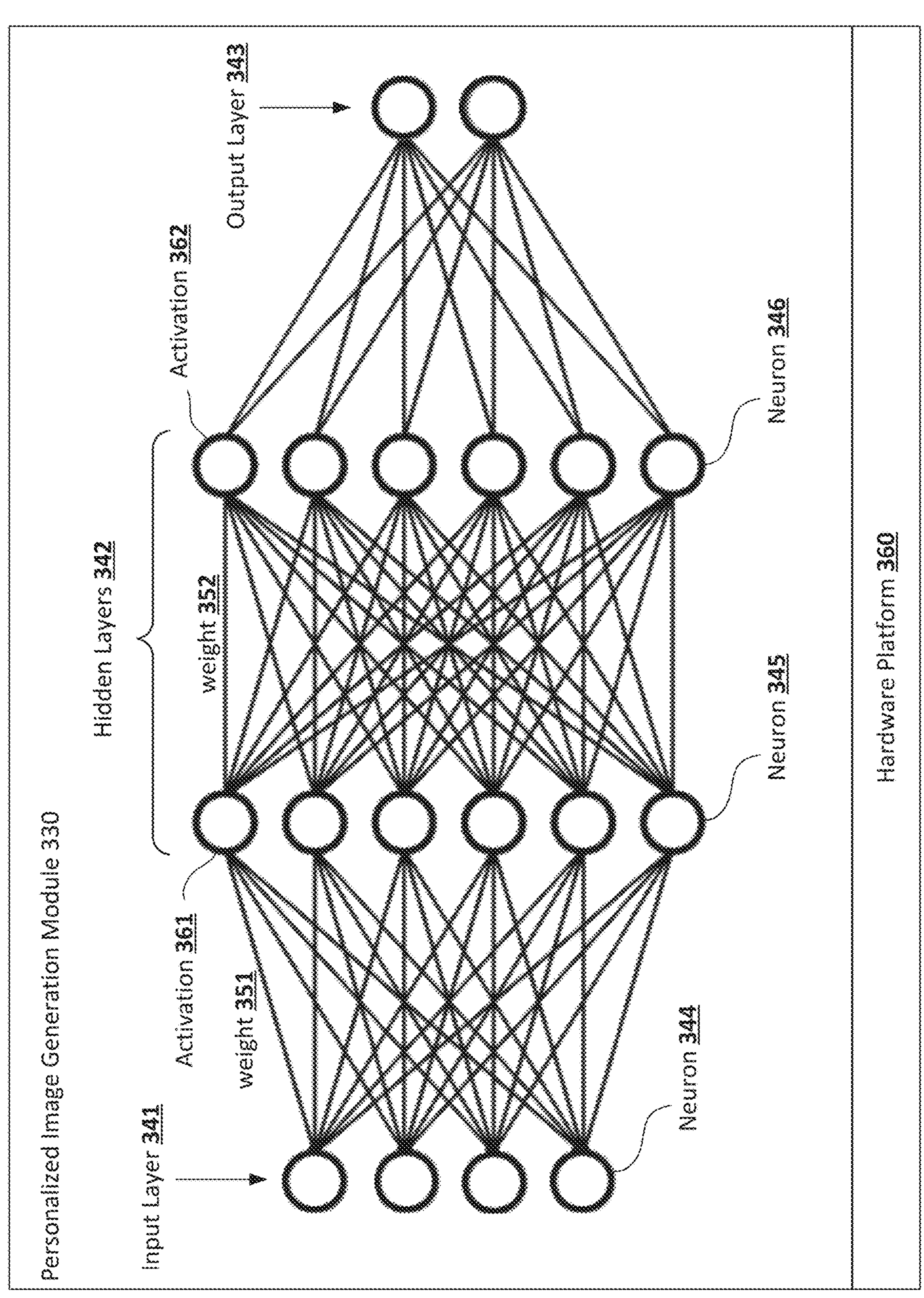
FIG. 3B is a simplified diagram illustrating a neural network structure, according to some embodiments.

FIG. 3B is a simplified diagram illustrating the neural network structure implementing the personalized image generation module 330 described in FIG. 3A, according to some embodiments. In some embodiments, the personalized image generation module 330 and/or one or more of its submodules 331-333 may be implemented at least partially via an artificial neural network structure shown in FIG. 3B. The neural network comprises a computing system that is built on a collection of connected units or nodes, referred to as neurons (e.g., 344, 345, 346). Neurons are often connected by edges, and an adjustable weight (e.g., 351, 352) is often associated with the edge. The neurons are often aggregated into layers such that different layers may perform different transformations on the respective input and output transformed input data onto the next layer.

For example, the neural network architecture may comprise an input layer 341, one or more hidden layers 342 and an output layer 343. Each layer may comprise a plurality of neurons, and neurons between layers are interconnected according to a specific topology of the neural network topology. The input layer 341 receives the input data (e.g., 340 in FIG. 3A), such as encoded image features. The number of nodes (neurons) in the input layer 341 may be determined by the dimensionality of the input data (e.g., the length of a vector of encoded image features. Each node in the input layer represents a feature or attribute of the input.

The hidden layers 342 are intermediate layers between the input and output layers of a neural network. It is noted that two hidden layers 342 are shown in FIG. 3B for illustrative purpose only, and any number of hidden layers may be utilized in a neural network structure. Hidden layers 342 may extract and transform the input data through a series of weighted computations and activation functions.

For example, as discussed in FIG. 3A, the personalized image generation module 330 receives an input 340 of a reference image and a prompt and transforms the input into an output 350 of a personalized generated image. To perform the transformation, each neuron receives input signals, performs a weighted sum of the inputs according to weights assigned to each connection (e.g., 351, 352), and then applies an activation function (e.g., 361, 362, etc.) associated with the respective neuron to the result. The output of the activation function is passed to the next layer of neurons or serves as the final output of the network. The activation function may be the same or different across different layers. Example activation functions include but not limited to Sigmoid, hyperbolic tangent, Rectified Linear Unit (ReLU), Leaky ReLU, Softmax, and/or the like. In this way, after a number of hidden layers, input data received at the input layer 341 is transformed into rather different values indicative data characteristics corresponding to a task that the neural network structure has been designed to perform.

The output layer 343 is the final layer of the neural network structure. It produces the network's output or prediction based on the computations performed in the preceding layers (e.g., 341, 342). The number of nodes in the output layer depends on the nature of the task being addressed. For example, in a binary classification problem, the output layer may consist of a single node representing the probability of belonging to one class. In a multi-class classification problem, the output layer may have multiple nodes, each representing the probability of belonging to a specific class.

Therefore, the personalized image generation module 330 and/or one or more of its submodules 331-333 may comprise the transformative neural network structure of layers of neurons, and weights and activation functions describing the non-linear transformation at each neuron. Such a neural network structure is often implemented on one or more hardware processors 310, such as a graphics processing unit (GPU).

In one embodiment, the personalized image generation module 330 and its submodules 331-333 may be implemented by hardware, software and/or a combination thereof. For example, the personalized image generation module 330 and its submodules 331-333 may comprise a specific neural network structure implemented and run on various hardware platforms 360, such as but not limited to CPUs (central processing units), GPUs (graphics processing units), FPGAs (field-programmable gate arrays), Application-Specific Integrated Circuits (ASICs), dedicated AI accelerators like TPUs (tensor processing units), and specialized hardware accelerators designed specifically for the neural network computations described herein, and/or the like. Example specific hardware for neural network structures may include, but not limited to Google Edge TPU, Deep Learning Accelerator (DLA), NVIDIA AI-focused GPUs, and/or the like. The hardware 360 used to implement the neural network structure is specifically configured based on factors such as the complexity of the neural network, the scale of the tasks (e.g., training time, input data scale, size of training dataset, etc.), and the desired performance.

In one embodiment, the neural network based personalized image generation module 330 and one or more of its submodules 331-333 may be trained by iteratively updating the underlying parameters (e.g., weights 351, 352, etc., bias parameters and/or coefficients in the activation functions 361, 362 associated with neurons) of the neural network based on a loss function. For example, during forward propagation, the training data such as reference images and/or prompts are fed into the neural network. The data flows through the network's layers 341, 342, with each layer performing computations based on its weights, biases, and activation functions until the output layer 343 produces the network's output 350. In some embodiments, output layer 343 produces an intermediate output on which the network's output 350 is based.

The output generated by the output layer 343 is compared to the expected output (e.g., a "ground-truth" such as the corresponding known-good image associated with a reference image and prompt) from the training data, to compute a loss function that measures the discrepancy between the predicted output and the expected output. Given the loss, the negative gradient of the loss function is computed with respect to each weight of each layer individually. Such negative gradient is computed one layer at a time, iteratively backward from the last layer 343 to the input layer 341 of the neural network. These gradients quantify the sensitivity of the network's output to changes in the parameters. The chain rule of calculus is applied to efficiently calculate these gradients by propagating the gradients backward from the output layer 343 to the input layer 341.

Parameters of the neural network are updated backwardly from the last layer to the input layer (backpropagating) based on the computed negative gradient using an optimization algorithm to minimize the loss. The backpropagation from the last layer 343 to the input layer 341 may be conducted for a number of training samples in a number of iterative training epochs. In this way, parameters of the neural network may be gradually updated in a direction to result in a lesser or minimized loss, indicating the neural network has been trained to generate a predicted output value closer to the target output value with improved prediction accuracy. Training may continue until a stopping criterion is met, such as reaching a maximum number of epochs or achieving satisfactory performance on the validation data. At this point, the trained network can be used to make predictions on new, unseen data, such as generating images based on unseen reference images and unseen prompts.

Neural network parameters may be trained over multiple stages. For example, initial training (e.g., pre-training) may be performed on one set of training data, and then an additional training stage (e.g., fine-tuning) may be performed using a different set of training data. In some embodiments, all or a portion of parameters of one or more neural-network model being used together may be frozen, such that the "frozen" parameters are not updated during that training phase. This may allow, for example, a smaller subset of the parameters to be trained without the computing cost of updating all of the parameters.

Therefore, the training process transforms the neural network into an "updated" trained neural network with updated parameters such as weights, activation functions, and biases. The trained neural network thus improves neural network technology in image generation.

Figure 4:
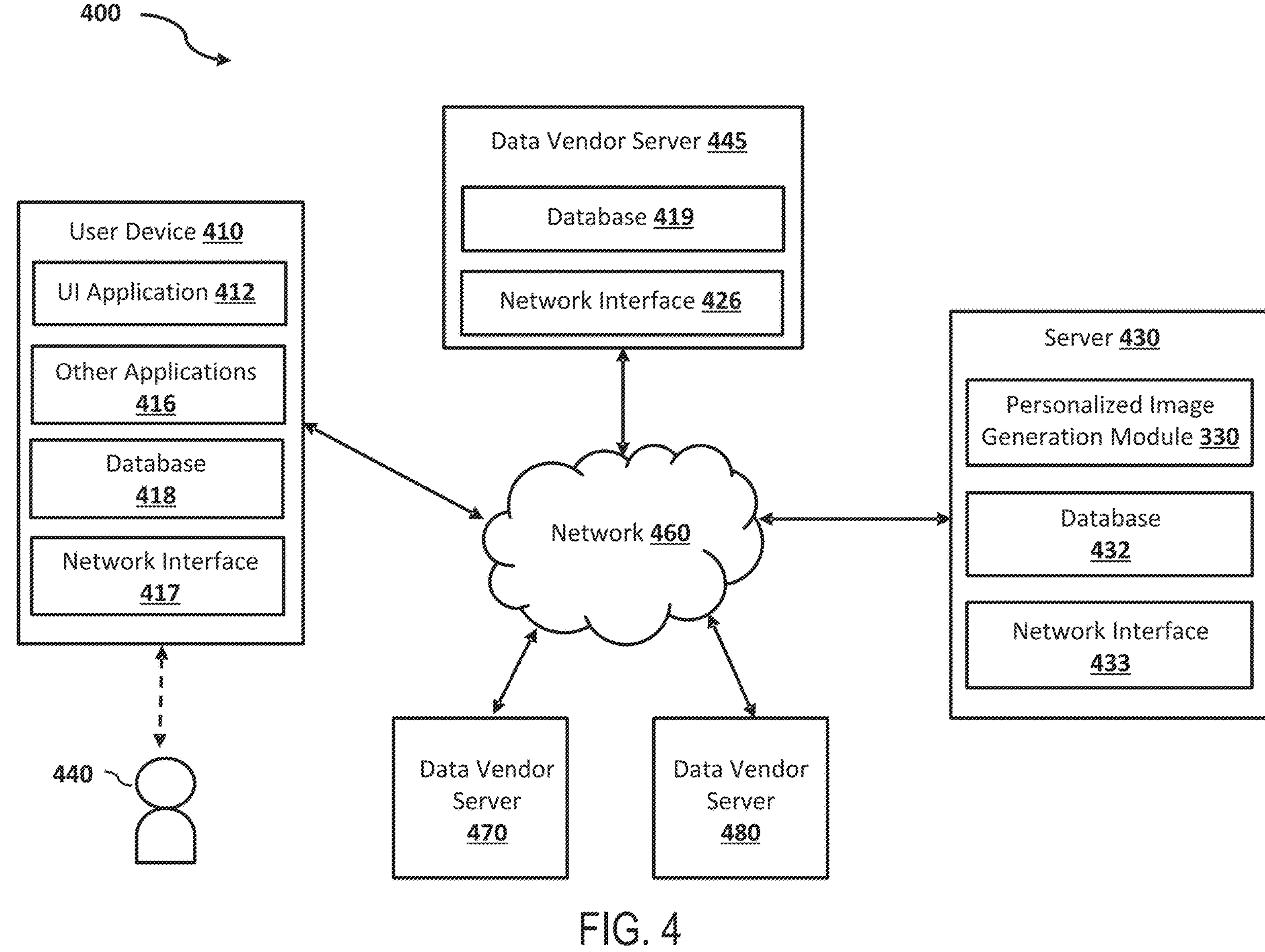
FIG. 4 is a simplified block diagram of a networked system suitable for implementing the personalized image generation framework described in FIGS. 1A-2 and other embodiments described herein.

FIG. 4 is a simplified block diagram of a networked system 400 suitable for implementing the personalized image generation framework described in FIGS. 1A-2 and other embodiments described herein. In one embodiment, system 400 includes the user device 410 which may be operated by user 440, data vendor servers 445, 470 and 480, server 430, and other forms of devices, servers, and/or software components that operate to perform various methodologies in accordance with the described embodiments. Exemplary devices and servers may include device, stand-alone, and enterprise-class servers which may be similar to the computing device 300 described in FIG. 3A, operating an OS such as a MICROSOFT® OS, a UNIX® OS, a LINUX® OS, or other suitable device and/or server-based OS. It can be appreciated that the devices and/or servers illustrated in FIG. 4 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

The user device 410, data vendor servers 445, 470 and 480, and the server 430 may communicate with each other over a network 460. User device 410 may be utilized by a user 440 (e.g., a driver, a system admin, etc.) to access the various features available for user device 410, which may include processes and/or applications associated with the server 430 to receive an output data anomaly report.

User device 410, data vendor server 445, and the server 430 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 400, and/or accessible over network 460.

User device 410 may be implemented as a communication device that may utilize appropriate hardware and software configured for wired and/or wireless communication with data vendor server 445 and/or the server 430. For example, in one embodiment, user device 410 may be implemented as an autonomous driving vehicle, a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 410 of FIG. 4 contains a user interface (UI) application 412, and/or other applications 416, which may correspond to executable processes, procedures, and/or applications with associated hardware. For example, the user device 410 may receive a message indicating a generated image from the server 430 and display the message via the UI application 412. In other embodiments, user device 410 may include additional or different modules having specialized hardware and/or software as required.

In various embodiments, user device 410 includes other applications 416 as may be desired in particular embodiments to provide features to user device 410. For example, other applications 416 may include security applications for implementing client-side security features, programmatic client applications for interfacing with appropriate application programming interfaces (APIs) over network 460, or other types of applications. Other applications 416 may also include communication applications, such as email, texting, voice, social networking, and IM applications that allow a user to send and receive emails, calls, texts, and other notifications through network 460. For example, the other application 416 may be an email or instant messaging application that receives a prediction result message from the server 430. Other applications 416 may include device interfaces and other display modules that may receive input and/or output information. For example, other applications 416 may contain software programs for asset management, executable by a processor, including a graphical user interface (GUI) configured to provide an interface to the user 440 to view generated images.

User device 410 may further include database 418 stored in a transitory and/or non-transitory memory of user device 410, which may store various applications and data and be utilized during execution of various modules of user device 410. Database 418 may store user profile relating to the user 440, predictions previously viewed or saved by the user 440, historical data received from the server 430, and/or the like. In some embodiments, database 418 may be local to user device 410. However, in other embodiments, database 418 may be external to user device 410 and accessible by user device 410, including cloud storage systems and/or databases that are accessible over network 460.

User device 410 includes at least one network interface component 417 adapted to communicate with data vendor server 445 and/or the server 430. In various embodiments, network interface component 417 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data vendor server 445 may correspond to a server that hosts database 419 to provide training datasets including reference images, known-good generated images, and prompts to the server 430. The database 419 may be implemented by one or more relational database, distributed databases, cloud databases, and/or the like.

The data vendor server 445 includes at least one network interface component 426 adapted to communicate with user device 410 and/or the server 430. In various embodiments, network interface component 426 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. For example, in one implementation, the data vendor server 445 may send asset information from the database 419, via the network interface 426, to the server 430.

The server 430 may be housed with the personalized image generation module 330 and its submodules described in FIG. 3A. In some implementations, personalized image generation module 330 may receive data from database 419 at the data vendor server 445 via the network 460 to generate images. The generated images may also be sent to the user device 410 for review by the user 440 via the network 460.

The database 432 may be stored in a transitory and/or non-transitory memory of the server 430. In one implementation, the database 432 may store data obtained from the data vendor server 445. In one implementation, the database 432 may store parameters of the personalized image generation module 330. In one implementation, the database 432 may store previously generated images, and the corresponding input feature vectors.

In some embodiments, database 432 may be local to the server 430. However, in other embodiments, database 432 may be external to the server 430 and accessible by the server 430, including cloud storage systems and/or databases that are accessible over network 460.

The server 430 includes at least one network interface component 433 adapted to communicate with user device 410 and/or data vendor servers 445, 470 or 480 over network 460. In various embodiments, network interface component 433 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 460 may be implemented as a single network or a combination of multiple networks. For example, in various embodiments, network 460 may include the Internet or one or more intranets, landline networks, wireless networks, and/or other appropriate types of networks. Thus, network 460 may correspond to small scale communication networks, such as a private or local area network, or a larger scale network, such as a wide area network or the Internet, accessible by the various components of system 400.

Figure 5:
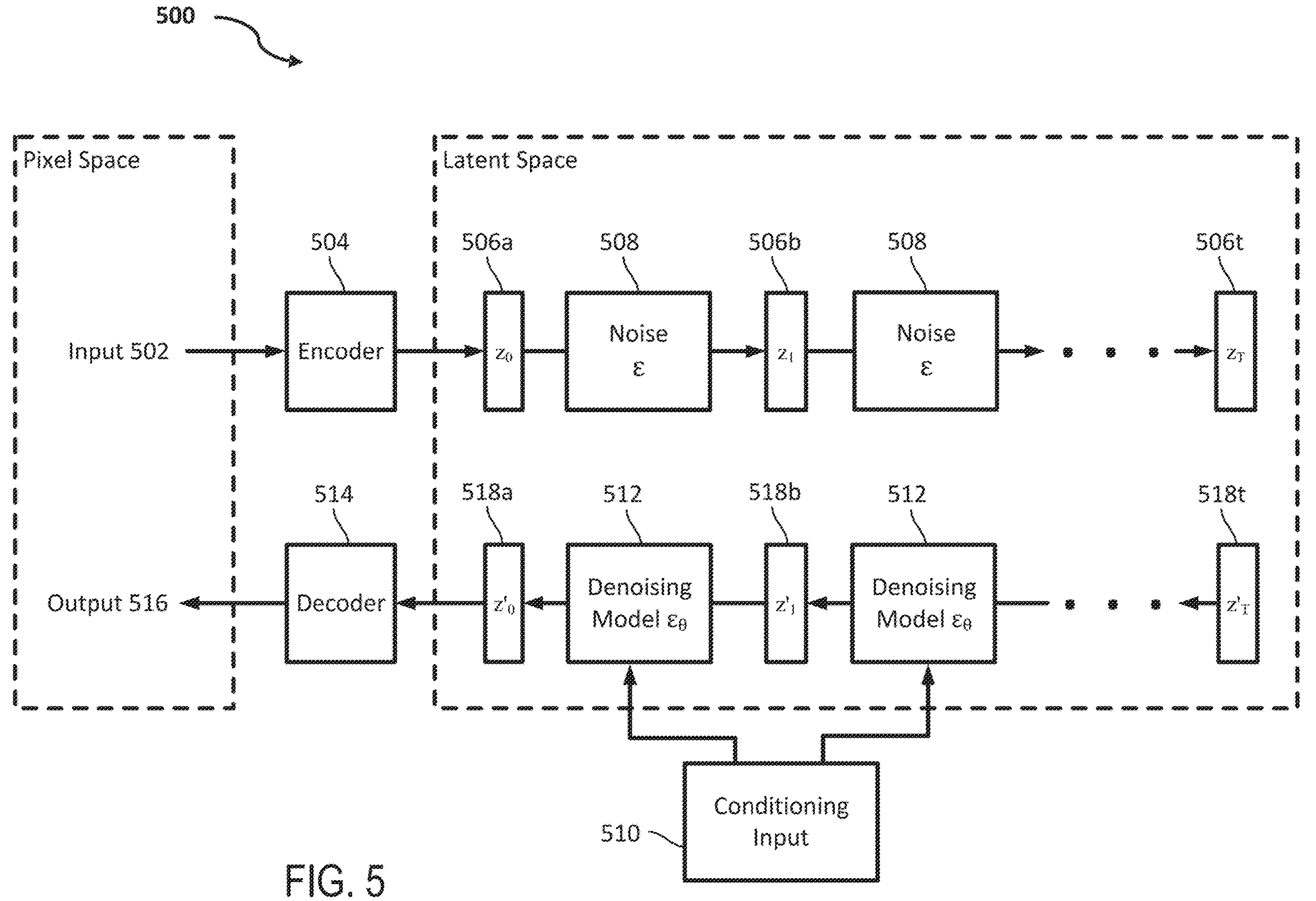
FIG. 5 is a simplified diagram illustrating an exemplary training framework for a denoising diffusion model according to some embodiments.

FIG. 5 is a simplified diagram illustrating an exemplary training framework 500 for a denoising diffusion model for generating or editing an image given a conditioning input such as a text prompt. In some embodiments, the reference UNet and/or base UNet are trained or pre-trained according to training framework 500. In one embodiment, a denoising diffusion model is trained to generate an image (e.g., output 516) based on a user input (e.g., a text prompt in conditioning input 510). At inference, the denoising diffusion model may receive a text prompt describing image content, and start with a random noise vector as a seed vector, and the denoising model progressively removes "noise" from the seed vector as conditioned by the user input (e.g., text prompt) such that the resulting image may gradually align with the user input. Completely removing the noise in a single step would be infeasibly difficult computationally. For this reason, the denoising model is trained to remove a small amount of noise, and the denoising step is repeated iteratively so that over a number of iterations (e.g., 50 iterations), the image eventually becomes clear.

Framework 500 illustrates how such a diffusion model may be trained to generate an image given a prompt by gradually removing noise from a seed vector. The top portion of the illustrated framework 500 including encoder 504 and the noise ε 508 steps may only be used during the training process, and not at inference, as described below. A training dataset may include a variety of images, which do not necessarily require any annotations, but may be associated with information such as a caption for each image in the training dataset that may be used as a conditioning input 510. A training image may be used as input 502. Encoder 504 may encode input 502 into a latent representation (e.g., a vector) which represents the image.

In some embodiments, a diffusion model may be trained using the pixel-level data directly. In other embodiments, a diffusion model may be trained on scaled down versions of images. Generally some form of encoder 504, however, is desirable so that the image is in a format which is more easily consumed by the denoising model $\varepsilon_\theta$ 512. The remaining description of framework 500 presumes encoder 504 generates a latent vector representation of input 502.

Latent vector representation $z_0$ 506*a* represents the first encoded latent representation of input 502. Noise ε 508 is added to the representation $z_0$ 506*a* to produce representation $z_1$ 506*b*. Noise ε 508 is then added to representation $z_1$ 506*b* to produce an even noisier representation. This process is repeated T times (e.g., 50 iterations) until it results in a noised latent representation $z_T$ 506*t*. The random noise ε 508 added at each iteration may be a random sample from a probability distribution such as Gaussian distribution. The amount (i.e., variance) of noise ε 508 added at each iteration may be constant, or may vary over the iterations. The amount of noise ε 508 added may depend on other factors such as image size or resolution.

This process of incrementally adding noise to latent image representations effectively generates training data that is used in training the diffusion denoising model 512, as described below. As illustrated, denoising model $\varepsilon_\theta$ 512 is iteratively used to reverse the process of noising latents (i.e., perform reverse diffusion) from $z'_T$ 518*t* to $z'_0$ 518*a*. Denoising model $\varepsilon_\theta$ 512 may be a neural network based model, which has parameters that may be learned. Input to denoising model $\varepsilon_\theta$ 512 may include a noisy latent representation (e.g., noised latent representation $z_T$ 506*t*), and conditioning input 510 such as a text prompt describing desired content of an output image, e.g., "a hand holding a globe." As shown, the noisy latent representation may be repeatedly and progressively fed into denoising model 512 to gradually remove noise from the latent representation vector based on the conditioning input 510, e.g., from $z'_T$ 518*t* to $z'_0$ 518*a*.

Ideally, the progressive outputs of repeated denoising models $\varepsilon_\theta$ 512 $z'_T$ 518*t* to $z'_0$ 518*a* may be an incrementally denoised version of the input latent representation $z'_T$ 518*t*, as conditioned by a conditioning input 510. The latent image representation produced using denoising model $\varepsilon_\theta$ 512 may be decoded using decoder 514 to provide an output 516 which is the denoised image.

In one embodiment, the output image 516 is then compared with the input training image 502 to compute a loss for updating the denoising model 512 via backpropagation. In another embodiment, the latent representation 506*a* of input 502 may be compared with the denoised latent representation 518*a* to compute a loss for training. In another embodiment, a loss objective may be computed comparing the noise actually added (e.g., by noise ε 508) with the noise predicted by denoising model $\varepsilon_\theta$ 512. Denoising model $\varepsilon_\theta$ 512 may be trained based on this loss objective (e.g., parameters of denoising model $\varepsilon_\theta$ 512 may be updated in order to minimize the loss by gradient descent using backpropagation). Note that this means during the training process of denoising model $\varepsilon_\theta$ 512, an actual denoised image does not necessarily need to be produced (e.g., output 516 of decoder 514), as the loss is based on each intermediate noise estimation, not necessarily the final image.

In one embodiment, conditioning input 510 may include a description of the input image 502, and in this way denoising model $\varepsilon_\theta$ 512 learns to reproduce the image described. Alternatively (or in addition), conditioning input 510 may include a text prompt, a conditioning image, an attention map, or other conditioning inputs. These inputs may be encoded in some way before being used by denoising model $\varepsilon_\theta$ 512. For example, a conditioning image may be encoded using an encoder similar to encoder 504. Conditioning input 510 may also include a time step, which may be used to provide the model with a general estimate of how much noise remains in the image, and the time step may increment (or decrement) for each iteration.

In some embodiments, denoising model $\varepsilon_\theta$ 512 may be implemented through a structure referred to as "U-Net." The U-Net structure may include a series of convolutional layers and pooling layers which generate progressively lower resolution multi-channel feature maps. Each pooling layer and an associated one or more convolutional layers may be considered an encoder. The convolutional and pooling layers (i.e., encoders) may be followed by a series of up-sampling layers and convolutional layers which generate progressively higher resolution multi-channel feature maps. Each up-sampling layer and an associated one or more convolutional layers may be considered a decoder. The U-Net May also include skip connections, where outputs of each encoder layer are concatenated with the corresponding decoder layer, skipping the intermediate encoder/decoder layers. Skip connections allow information about the precise location of features extracted by convolutional (encoder) layers. The convolutional kernels for convolution layers, and up-sampling functions for the up-sampling layers may be learned during a training process. Conditioning inputs (e.g., images or a natural language prompt) may be used to condition the function of a U-Net. For example, conditioning inputs may be encoded and cross-attention may be applied between the encoded conditioning inputs and the feature maps at the encoder/decoder layers.

The direct output of denoising model $\varepsilon_\theta$ 512 (e.g., when implemented as a U-Net) may be an estimation of the noise present in the input latent representation, or more generally a noise distribution. In this sense, the direct output may not by a latent representation of an image, but rather of the noise. Using this estimated noise, however, an incrementally denoised image representation may be produced which may be an input to the next iteration of denoising model $\varepsilon_\theta$ 512.

At inference, denoising model $\varepsilon_\theta$ 512 may be used to denoise a latent image representation given a conditioning input 510. Rather than a noisy latent image representation $z_T$ 506*t*, the input to the sequence of denoising models may be a randomly generated vector which is used as a seed. Different images may be generated by providing different random starting seeds. The resulting denoised latent image representation after T denoising model steps may be decoded by a decoder (e.g., decoder 514) to produce an output 516 of a denoised image. For example, conditioning input may include a description of an image, and the output 516 may be an image which is aligned with that description.

Note that while denoising model $\epsilon_\theta$ 512 is illustrated as the same model being used iteratively, distinct models may be used at different steps of the process. Further, note that a "denoising diffusion model" may refer to a single denoising model $\epsilon_\theta$ 512, a chain of multiple denoising models $\epsilon_\theta$ 512, and/or the iterative use of a single denoising model $\epsilon_\theta$ 512. A "denoising diffusion model" may also include related features such as decoder 514, any pre-processing that occurs to conditioning input 510, etc. This framework 500 of the training and inference of a denoising diffusion model may further be modified to provide improved results and/or additional functionality, for example as in embodiments described herein.

Figure 6:
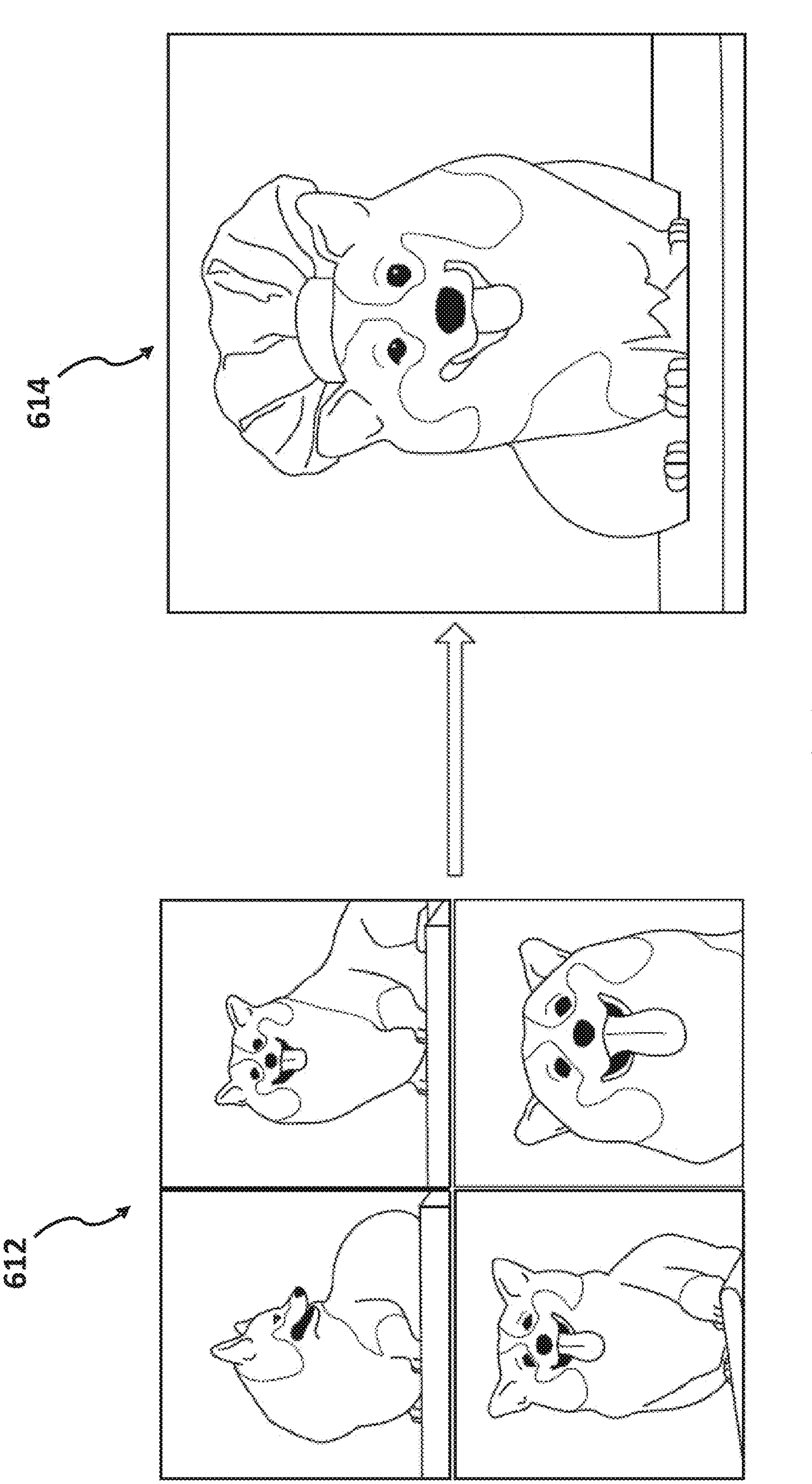
FIG. 6 illustrates an example of a personalized image generation, according to some embodiments.

FIG. 6 illustrates an example of a personalized image generation, according to some embodiments. One or more of reference images 612 may be input to a reference UNet (e.g., reference UNet 155) with a prompt. The prompt may be, for example, "A photo of my dog with a chef's hat". The resulting image generated using the base UNet as modified by the reference UNet may be generated image 614, illustrating the same subject dog as the reference pictures, varied according to the prompt (here, the dog of the reference images with a chef's hat).

Figure 7:
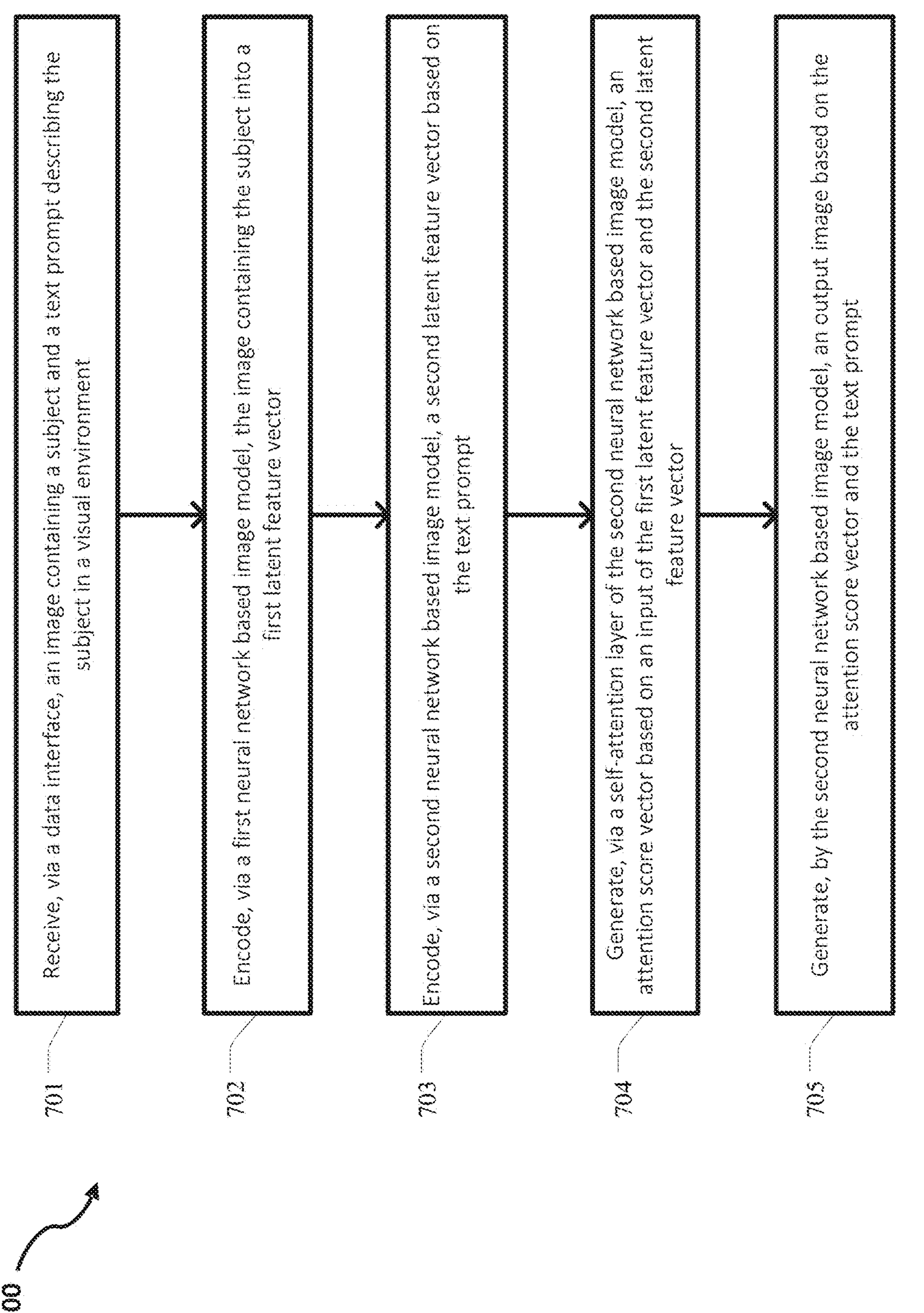
FIG. 7 is an example logic flow diagram illustrating a method of personalized image generation based on the framework shown in FIGS. 1A-2, according to some embodiments.

FIG. 7 is an example logic flow diagram illustrating a method 700 of personalized image generation based on the framework shown in FIGS. 1A-2, according to some embodiments. One or more of the processes of method 700 may be implemented, at least in part, in the form of executable code stored on non-transitory, tangible, machine-readable media that when run by one or more processors may cause the one or more processors to perform one or more of the processes. In some embodiments, method 700 corresponds to the operation of the personalized image generation module 330 (e.g., FIGS. 3A and 4) that performs personalized image generation.

As illustrated, the method 700 includes a number of enumerated steps, but aspects of the method 700 may include additional steps before, after, and in between the enumerated steps. In some aspects, one or more of the enumerated steps may be omitted or performed in a different order.

At step 701, a system (e.g., computing device 300 or server 430) receives, via a data interface (e.g., data interface 315 or network interface 433), an image (e.g., reference image 128) containing a subject and a text prompt (e.g., prompt 126) describing the subject in a visual environment.

At step 702, the system encodes, via a first neural network based image model (e.g., reference UNet 155), the image containing the subject into a first latent feature vector. Encoding the image may include replacing a background of the image with a featureless background (e.g., a plain white background).

At step 703, the system encodes, via a second neural network based image model (e.g., base UNet 150), a second latent feature vector based on the text prompt.

At step 704, the system generates, via a self-attention layer (e.g., RSA 106) of the second neural network based image model, an attention score vector based on an input of the first latent feature vector and the second latent feature vector. In some embodiments, more than one image may be used as the input (e.g., multiple images of the same subject in different positions). A second image containing the subject may be received, via the data interface. The first neural network based image model may encode the second image into a third latent feature vector. The system may generate a combined vector combining the values of the first latent feature vector and the third latent feature vector, for example by generating a weighted average of the first latent feature vector and the third latent feature vector. Generating the attention score vector may include generating, via the self-attention layer of the second neural network based image model, the attention score vector based on the combined vector. In some embodiments, multiple self-attention layers may be given inputs from the first neural network based image model to further adjust the output image generated. A plurality of self-attention layers of the second neural network based image model may generate a plurality of attention score vectors based on a plurality of latent feature vectors generated by the first neural network based image model. Generating the output image may be further based on the plurality of attention score vectors. For example, as illustrated in FIG. 1B, base UNet 150 may have self-attention layers 106, 110, 116, and 120. In some embodiments, each of self attention layers 106, 110, 116, and 120 are provided inputs from the first neural network based image model. In some embodiments, only some of the self-attention layers may receive inputs from the first neural network based image model. For example, only self-attention layers 106 and 120 of base UNet 150, or only self-attention layers 110 and 116 of base UNet 150. In some embodiments, the selection of which self-attention layers are provided inputs from the first neural network based image model is configurable and may be adjusted to achieve a desired behavior. For example, by modifying only the early and late self-attention layers, the style of the output image may be more affected by the reference image, and modifying only the center self-attention layers may affect more of the semantics (e.g., specific objects) of the output image.

At step 705, the system generates, by the second neural network based image model, an output image (e.g., output image 124) based on the attention score vector and the text prompt. In some embodiments, the system updates parameters of the first neural network based image model based on the output image while refraining from updating parameters of the second neural network based image model. In some embodiments, a subset of the parameters of the second neural network based image model are trained (e.g., the modified self-attention layers) In some embodiments, the first and second neural network based image models are used iteratively by using the generated output image as the input to the second neural network based image model and repeating steps 702-705. At each iteration, a different time step may be provided to the first and second neural network based image models indicating an expected amount of noise. The provided image may be artificially noised to match an expected amount of noise at the current time step. For example, if the image generation process is configured for 50 denoising steps (i.e., 50 iterations of the first and second neural network based image models), then in the first iteration the image may be noised through a diffusion process 50 noising steps corresponding to the 50 denoising steps, and that noised image may be used as the input to the first neural network based image model. At the next iteration, a version of the image only noised 49 steps would be used as the input, and so on for the remaining iterations.

FIGS. 8-11 provide charts illustrating exemplary performance of different embodiments described herein. The methods described herein were implemented for the experiments as follows. The dataset synthesis pipeline discussed in FIG. 2 was used to synthesize 200000 (reference image, target image, target caption) triplets as training data. A large language model (LLM) was provided a prompt used to generate the images. A pre-trained latent diffusion model was used. The Base U-Net and Reference U-Net were both initialized from the pretrained Diffusion U-Net weights. During training, the reference images were augmented by randomly resizing the foreground, horizontally flipping and moving the foreground to random locations. The model was trained using 16 A100 GPUS, with a total batch size of 64 for 10 k updates. A learning rate of 5e-6 was used for the Reference U-Net and 1e-6 for the RSA layers of the Base U-Net. The entire training lasted 70 minutes (compared to BLIP-Diffusion requires 6 days with the same amount of compute). During inference, images were generated using 50 inference steps. For classifier free guidance, experiments used $\eta$im=5.0 and $\eta$text+im=7.5 in all the experiments. In FIGS. 8-11, the implementation of methods described herein are labeled as "BootPIG".

Baseline image generation models used for comparison include BLIP-Diffusion as described in Li et al., Pre-trained subject representation for controllable text-to-image generation and editing, arXiv:2305.14720, 2023. Another baseline model used for comparison is ELITE as described in Wei et al., Elite: Encoding visual concepts into textual embeddings for customized text-to-image generation, arXiv:2302.13848, 2023. Another model used for comparison is DreamBooth (the dataset of DreamBooth was also used in experiments) as described in Ruiz et al., Dreambooth: Fine tuning text-to-image diffusion models for subject-driven generation, Proceedings of the IEEE/CVF Conference on Computer Vision and Pattern Recognition, p. 22500-22510, 2023. Metrics used in the experiments include DINO, CLIP-I, and CLIP-T scores as described in Ruiz et al., Dreambooth: Fine tuning text-to-image diffusion models for subject-driven generation, arXiv: 2208.12242, 2022. DINO and CLIP-I scores measure subject alignment and CLIP-T measures image-text alignment.

Figure 8:
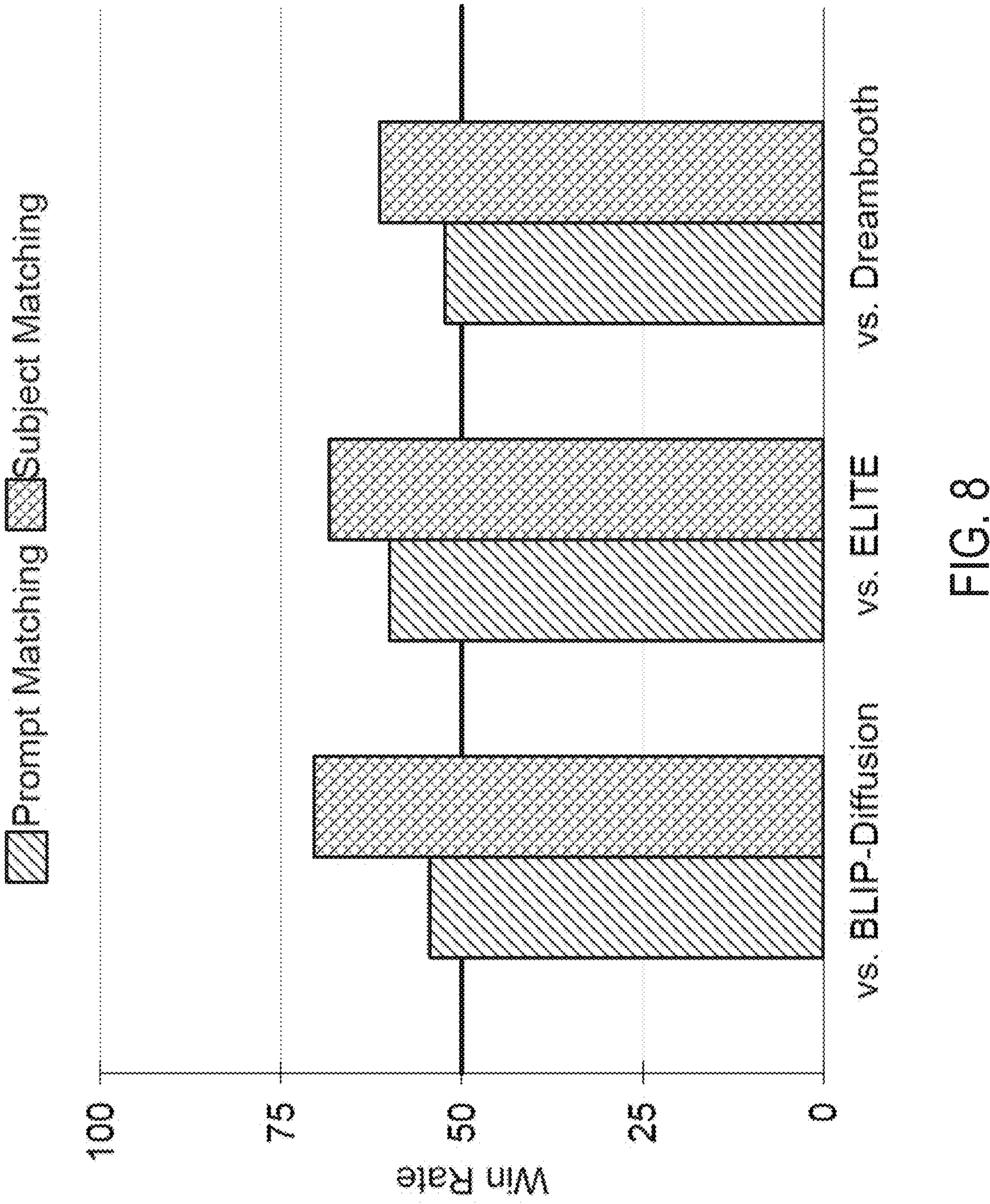

FIG. 8 illustrates the results of a user study. The figure illustrates the win rate (% of users who favored BootPIG generations) against existing methods. One study evaluated prompt fidelity and the other evaluated subject fidelity. As illustrated, users consistently prefer BootPIG generations over both zero-shot and test-time finetuned methods. Human evaluators find BootPIG generations to have significantly greated subject fidelity (69% win rate versus ELITE 65% win rate versus BLIP-Diffusion, and 62% win rate versus DreamBooth). Additionally, the user study demonstrates that generations from BootPIG exhibit higher fidelity to the caption than existing methods. These results underscore the efficacy of the training methods described herein.

FIG. 9 illustrates quantitative comparisons between different models. Average metrics are reported for subject fidelity (CLIP-I, DINA) and prompt fidelity (CLIP-T) on the Dreambooth dataset. BootPIG outperforms all existing zero-shot methods in prompt fidelity (+1.1 CLIP-T) and subject fidelity (+0.8 CLIP-I, +2.4 DINO) metrics. Compared to test-time finetuned methods, BootPIG exhibits state-of-the-art performance in prompt fidelity (+0.6 CLIP-T) while performing comparably in subject fidelity.

FIG. 10 illustrates a chart demonstrating the effect of training different components. Quantitative studies were performed on the effect of updating or fixing different components of the BootPIG architecture during training. It was observed that the optimal strategy was to train the entire Reference U-Net and only train the RSA layers of the base U-Net. Finetuning both networks is very memory intensive.

Figure 11:
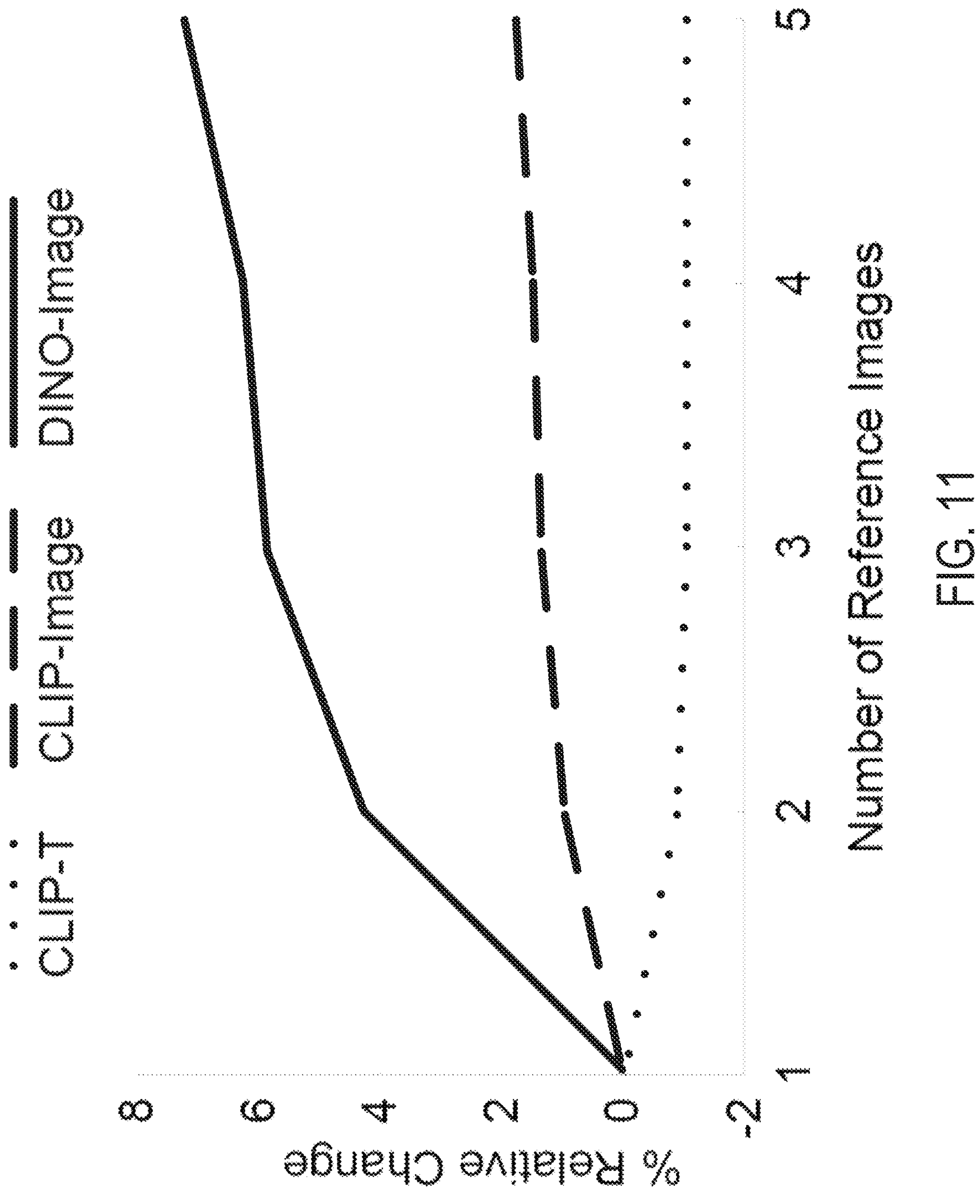

FIG. 11 illustrates the effect of using multiple reference images in generating a single image. Increasing the number of reference images significantly improves subject fidelity, while slightly worsening prompt fidelity. This highlights the efficacy of an inference strategy that accounts for multiple reference images.

Embodiments described herein provide a number of benefits. For example, unlike existing Zero-Shot Inference methods that require several days of compute for pretraining, our proposed model can be trained in approximately 1 hour on 16 A100 GPUs. Embodiments described herein provide the efficiency of Zero-Shot Inference methods while outperforming existing Test-time Finetuning methods, while having faster inference-time performance, requiring less computation and memory resources by not requiring inference-time fine-tuning of model parameters. The framework described herein avoids introducing a bottleneck in the form of text-aligned features and, instead, uses the features from the generative backbone (e.g., of a UNet) to guide generation. Therefore, with improved performance on personalized image generation, neural network technology in image generation is improved.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and, in a manner, consistent with the scope of the embodiments disclosed herein.

What is claimed is:

1. A method of subject-driven image generation, the method comprising:

receiving, via a data interface, an image containing a subject and a text prompt describing the subject in a visual environment;

encoding, via a first neural network based image model, the image containing the subject into a first latent feature vector;

encoding, via a second neural network based image model, a noisy image into a second latent feature vector based on the text prompt;

receiving, via the data interface, a second image containing the subject;

encoding, via the first neural network based image model, the second image into a third latent feature vector;

generating a combined vector combining values of the first latent feature vector and the third latent feature vector;

generating, via a self-attention layer of the second neural network based image model, an attention score vector based on inputs from the combined vector and the second latent feature vector; and generating, by the second neural network based image model, an output image based on the attention score vector and the text prompt.

2. The method of claim 1, wherein the generating the combined vector includes generating a weighted average of the first latent feature vector and the third latent feature vector.

3. The method of claim 1, further comprising:

updating parameters of the first neural network based image model based on the output image while refraining from updating parameters of the second neural network based image model.

4. The method of claim 1, wherein the encoding the image containing the subject into a first latent feature vector includes replacing a background of the image with a featureless background.

5. The method of claim 1, further comprising:

generating, via a plurality of self-attention layers of the second neural network based image model, a plurality of attention score vectors based on a plurality of latent feature vectors generated by the first neural network based image model, wherein the generating the output image is further based on the plurality of attention score vectors.

6. The method of claim 5, wherein the generating the output image is further based on a plurality of attention score vectors generated via a second plurality of self-attention layers without an input generated by the first neural network based image model.

7. A system for subject-driven image generation, the system comprising:

a memory that stores a first neural network based image model, a second neural network based image model, and a plurality of processor executable instructions;

a communication interface that receives an image containing a subject and a text prompt describing the subject in a visual environment; and one or more hardware processors that read and execute the plurality of processor-executable instructions from the memory to perform operations comprising:

encoding, via a first neural network based image model, the image containing the subject into a first latent feature vector;

encoding, via a second neural network based image model, a noisy image into a second latent feature vector based on the text prompt;

receiving, via the data interface, a second image containing the subject;

encoding, via the first neural network based image model, the second image into a third latent feature vector;

generating a combined vector combining values of the first latent feature vector and the third latent feature vector;

generating, via a self-attention layer of the second neural network based image model, an attention score vector based on inputs from the combined vector and the second latent feature vector; and generating, by the second neural network based image model, an output image based on the attention score vector and the text prompt.

8. The system of claim 7, wherein the generating the combined vector includes generating a weighted average of the first latent feature vector and the third latent feature vector.

9. The system of claim 7, the operations further comprising:

updating parameters of the first neural network based image model based on the output image while refraining from updating parameters of the second neural network based image model.

10. The system of claim 7, wherein the encoding the image containing the subject into a first latent feature vector includes replacing a background of the image with a featureless background.

11. The system of claim 7, the operations further comprising:

generating, via a plurality of self-attention layers of the second neural network based image model, a plurality of attention score vectors based on a plurality of latent feature vectors generated by the first neural network based image model, wherein the generating the output image is further based on the plurality of attention score vectors.

12. The system of claim 11, wherein the generating the output image is further based on a plurality of attention score vectors generated via a second plurality of self-attention layers without an input generated by the first neural network based image model.

13. A non-transitory machine-readable medium comprising a plurality of machine-executable instructions which, when executed by one or more processors, are adapted to cause the one or more processors to perform operations comprising:

receiving, via a data interface, an image containing a subject and a text prompt describing the subject in a visual environment;

encoding, via a first neural network based image model, the image containing the subject into a first latent feature vector;

encoding, via a second neural network based image model, a noisy image into second latent feature vector based on the text prompt;

receiving, via the data interface, a second image containing the subject;

encoding, via the first neural network based image model, the second image into a third latent feature vector;

generating a combined vector combining values of the first latent feature vector and the third latent feature vector;

generating, via a self-attention layer of the second neural network based image model, an attention score vector based on inputs from the combined vector and the second latent feature vector; and generating, by the second neural network based image model, an output image based on the attention score vector and the text prompt.

14. The non-transitory machine-readable medium of claim 13, wherein the generating the combined vector includes generating a weighted average of the first latent feature vector and the third latent feature vector.

15. The non-transitory machine-readable medium of claim 13, the operations further comprising:

updating parameters of the first neural network based image model based on the output image while refraining from updating parameters of the second neural network based image model.

16. The non-transitory machine-readable medium of claim 13, wherein the encoding the image containing the subject into a first latent feature vector includes replacing a background of the image with a featureless background.

17. The non-transitory machine-readable medium of claim 13, the operations further comprising:

generating, via a plurality of self-attention layers of the second neural network based image model, a plurality of attention score vectors based on a plurality of latent feature vectors generated by the first neural network based image model, wherein the generating the output image is further based on the plurality of attention score vectors.

* * * * *